United States Patent [19]
Matui

[11] 3,771,240
[45] Nov. 13, 1973

[54] SELF-TEACHING SYSTEM

[75] Inventor: Megumi Matui, Ohta-ku, Tokyo, Japan

[73] Assignee: Gakken Co., Ltd., Tokyo, Japan

[22] Filed: July 8, 1971

[21] Appl. No.: 160,586

[30] Foreign Application Priority Data
Aug. 5, 1970  Japan.............................. 45/77482
Aug. 21, 1970  Japan.............................. 45/82832

[52] U.S. Cl. ................................................ 35/9 C
[51] Int. Cl. ........................................... G09b 7/06
[58] Field of Search ...................... 35/8 A, 9 A, 9 B, 35/9 C

[56] References Cited
UNITED STATES PATENTS
3,605,285  9/1971  Bendaniel et al. .................. 35/8 A
3,421,231  1/1969  Kane .................................... 35/9 C
3,579,864  5/1971  Littwin ................................. 35/9 C
3,106,027  10/1963  Thelen ................................ 35/9 C Primary Examiner—Wm. H. Grieb
Attorney—Irving M. Weiner

[57] ABSTRACT

An electric self-teaching system is comprised of a sensing device, a rod shaped implement thereby to work on the sensing device, and a displaying device. The sensing device includes an electrically insulating base on which a number of conducting portions are printed or otherwise formed, the conducting portions being electrically interconnected into a plurality of groups in a prescribed manner. An electrically conducting sheet is laid over the base through a comparatively thick insulating sheet having punched perforations in alignment with the aforesaid conducting portions. By pressure applied in a selected area on the sensing device, the conducting sheet is depressed into electric contact with one of the conducting portions thereby closing the corresponding one of the circuits that are respectively connected to lamps arranged adjacent a plurality of symbols within the displaying device. The symbol thus illuminated by the lamp is directly exhibited on a screen.

1 Claim, 9 Drawing Figures

3,771,240

INVENTOR.
MEGUMI MATUI

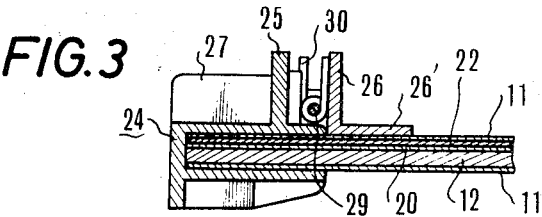
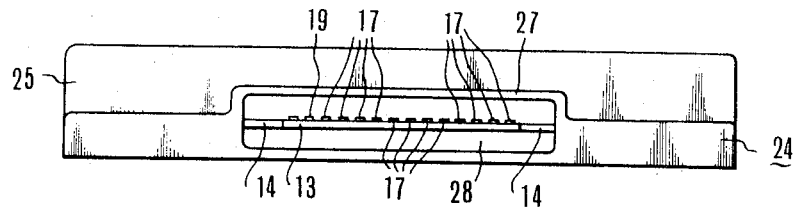
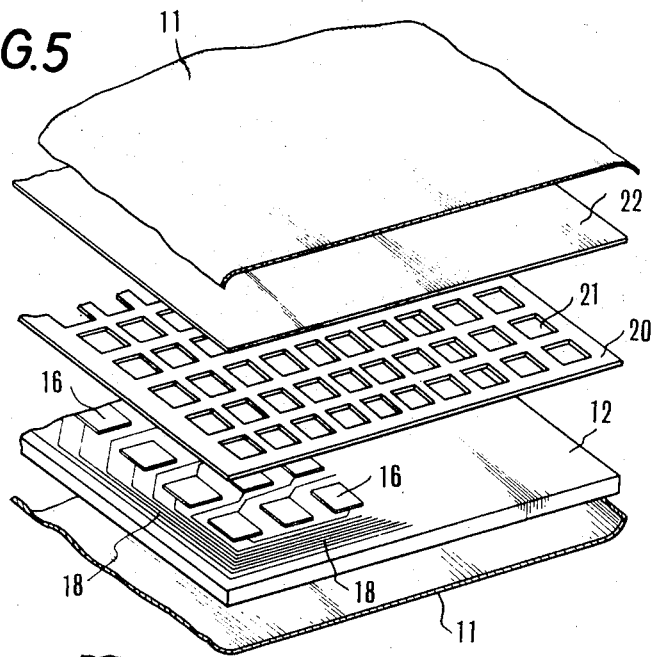
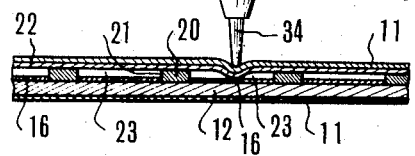

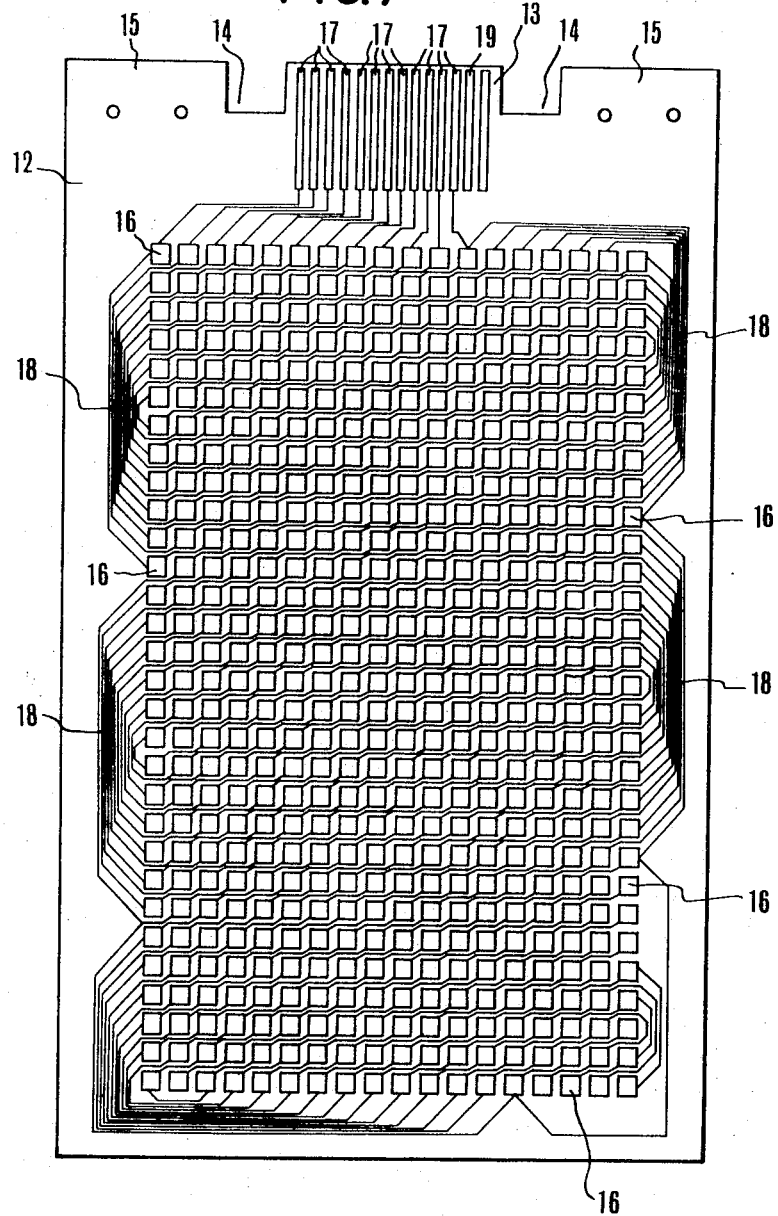

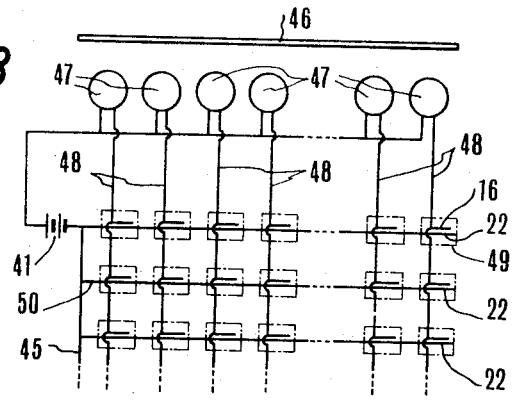
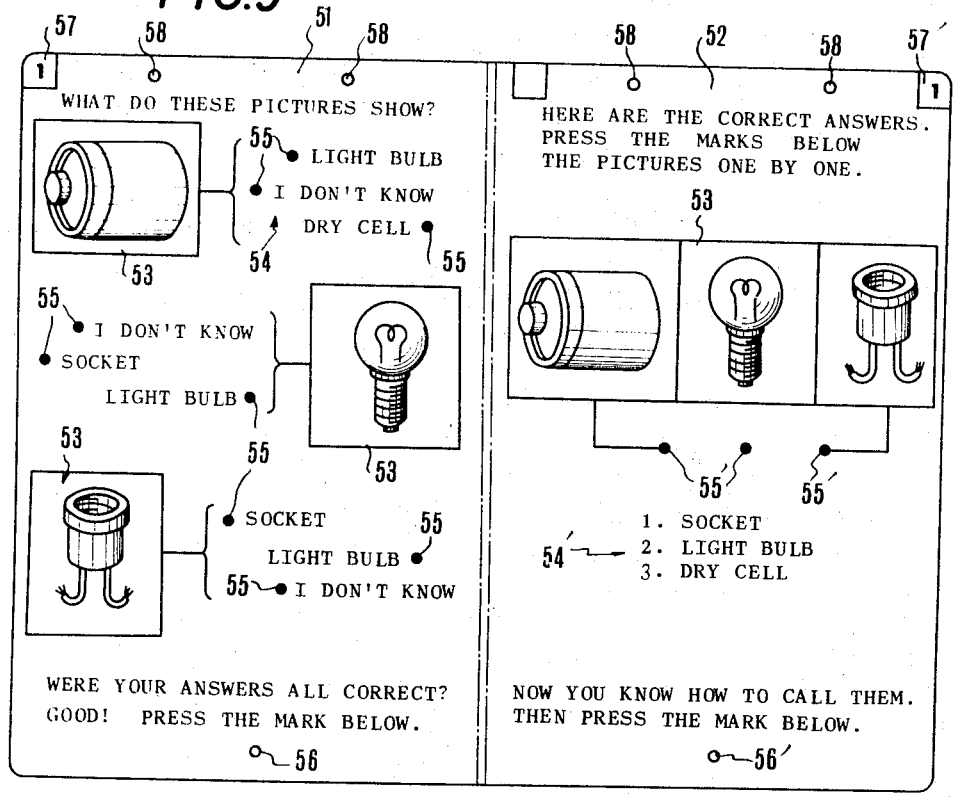

SELF-TEACHING SYSTEM

The present invention relates to an electric self-teaching or self-testing system, and in particular to such a system comprising a sensing device, a rod shaped implement thereby to press a selected area of a work sheet or the like placed upon the sensing device, and a displaying device electrically associated with the sensing device in such a manner that a symbol related with the selected area is exhibited on a screen.

Known systems of comparable design are mostly comprised of a sensing device consisting essentially of a plurality of sheet members, a pin or the like to be pierced through or pressed on a selected area of a work sheet placed on the sensing device, and a lamp connected with the normally open circuit of the sensing device. The circuit is closed and the lamp lit up only when a correct answer has been selected by a user. It will be readily understood that with this type of system, the user is only informed of whether the answer he has selected is correct or not. Moreover, as the user gets accustomed to his sensing device, it has been quite possible that he should learn by heart the entire arrangement of its correct answer areas.

The U.S. Pat. No. 3,106,027, for instance, discloses a sensing device comprising a base, a first conductor sheet on the base, a perforated control sheet on the first conductor sheet, a second conductor sheet on the perforated control sheet, and a work sheet further upon the second conductor sheet. These individual sheets are held in place by means of a clamp. According to this U.S. patent the user is not likely to know the locations of the correct answer areas as above because differently perforated control sheets may be used in combination with different work sheets. This however, unnecessarily inconveniences the user and makes the overall device unduly expensive.

Also according to the same U.S. patent a normally open circuit to a lamp attached to the sensing device itself is closed upon depression of a selected area of the work sheet and the underlying second conductor sheet in alignment with a perforation through the control sheet, with the resultant electric contact between the second conductor sheet and the first conductor sheet. Thus the device simply exhibits whether the answer selected by the user is correct or wrong by the lighting or non-lighting of the lamp. As an added disadvantage, its use is not simplified enough because at least the work sheet and control sheet as well as the second conductor sheet sandwiched therebetween have to be neatly arranged and secured in position at the start of each learning period.

The self-teaching system according to the present invention is broadly comprised of a sensing device of entirely novel structure, a rod shaped implement thereby to work on the sensing device, and a displaying device electrically associated with the sensing device. Preferably, the work sheets for use with the self-teaching system of the invention are provided in somewhat loosely bounded book format. Each work sheet carries marks or indices for adjusting the sheet neatly in position upon the sensing device. One or both surfaces of the work sheet contains questions each with a plurality of likely answers including the correct one, as well as explanatory notes and cross references. Not only the answers but the notes and the cross rferences may be accompanied by suitable marks to be pressed by the rod shaped implement to close the corresponding one of a plurality of circuits of the system and hence to cause a symbol related with the closed circuit to be exhibited on a screen of the displaying device. Thus, besides indicating whether the selected answer is correct or not, the displaying device can be so made as to direct the user to proceed to the next question or to the next sheet, to refer back to the preceding sheets, and so forth. It is accordingly possible, and indeed desirable, to prepare a special workbook in which all the questions and answers are arranged systematically in accordance with a predetermined program.

It is therefore an object of the present invention to provide a novel self-teaching system of simple and inexpensive construction which is employable for instructional and other purposes depending upon the contents of work sheets used in combination therewith.

Another object of the invention is to provide a novel sensing device in which all the sheet members except a work sheet are substantially completely enveloped in a covering of electrically insulating material, so that the device is rendered highly durable, efficient and easy to use.

Another object of the invention is to provide a sensing device in which correct answer areas are provided in a manner that defies the memory of the user.

A further object of the invention is to provide a novel displaying device for use with a sensing device of the character referred to, which is capable of displaying substantially any desired symbols including letters, numerals, and characters.

A further still object of the invention is to provide a self-teaching system incorporating a sensing device and a displaying device of the respective characters referred to, whereby the user can learn substantially any desired subject of study according to a predetermined program.

Other objects, features and advantages of this invention will be apparent from the following detailed description when read in connection with the accompanying drawings which illustrate, by way of example only, a preferred form of the self-teaching system of the invention, and in which:

FIG. 3 is a fragmentary sectional view of the sensing device as indicated by arrow III in FIG. 2;

FIG. 4 is an end elevational view looking substantially in the direction of arrow IV in FIG. 2;

FIG. 5 is a fragmentary, exploded perspective view of the sensing device;

FIG. 6 is an enlarged fragmentary detail sectional view of the sensing device in combination with a pencil-like implement depressing its covering and electrically conducting sheet;

FIG. 7 is an enlarged top or plan view of an electrically insulating base of the sensing device which has a number of conducting portions printed thereupon in accordance with the present invention;

FIG. 8 is a schematic circuit diagram showing the electrical arrangement of the self-teaching system; and FIG. 9 illustrates an associated pair of work sheets for use with the self-teaching system of the present invention.

Figure 1:
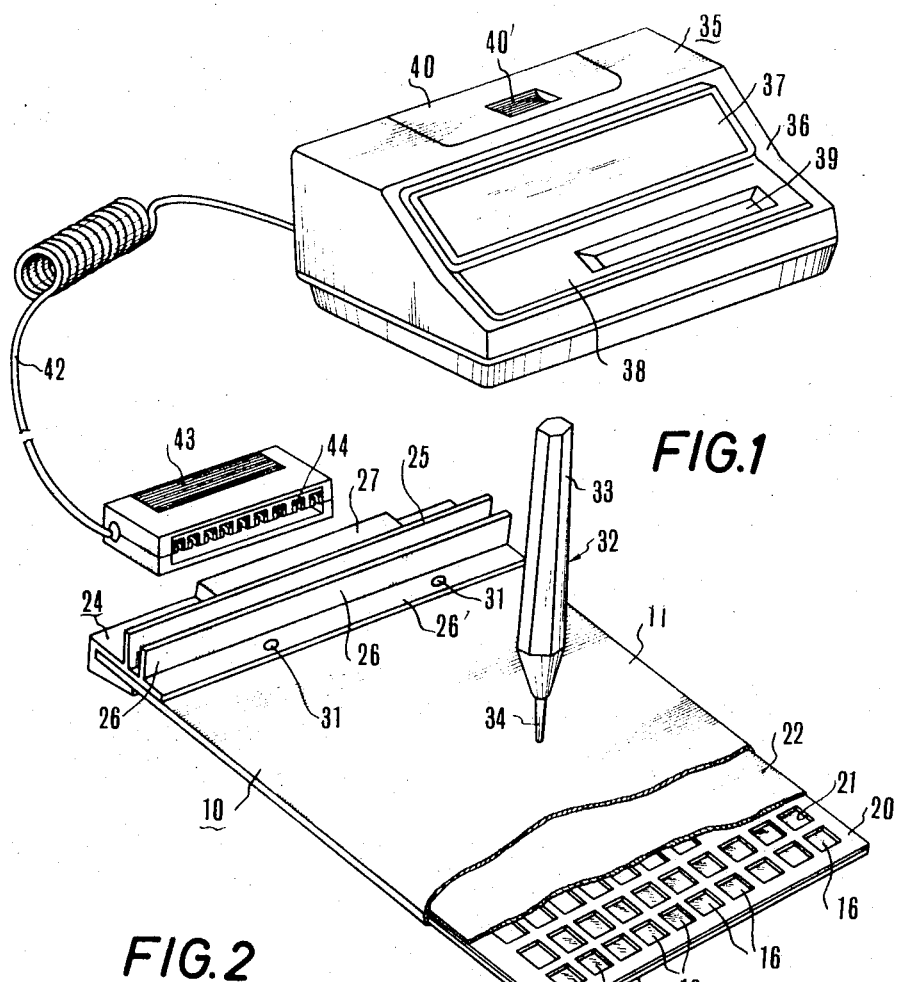
FIG. 1 is a perspective view of a self-teaching system in accordance with the concepts of the present invention, in which only a sensing device is shown partly broken away to show the inner details in greater detail.

Referring now to the drawings, and particularly to FIG. 1 thereof in order to describe the exemplified form of the self-teaching system in accordance with the present invention, the system is broadly comprised of a sensing device, a non-conducting rod shaped implement thereby to work on the sensing device, and a displaying device. As illustrated, the sensing device 10 is substantially flat and rectangular in shape, with a suitably thin covering or envelope 11 of electrically insulating material such as, preferably, plastics. Enveloped in this covering 11 are a base 12, electrically insulating sheet and electrically conducting sheet in superposition, as hereinafter referred to in detail. The base 12, which has to be suitably rigid, is also made of plastics or other electrically insulating material.

With reference now made to FIG. 7 in particular, the aforesaid base 12 has a pair of recesses 14 cut into one edge thereof which define a portion 13, carrying a number of terminals still to be described, and portions 15, on which clamp means is to be secured in a manner noted hereinafter. On the surface of this base 12 there are regularly printed, or otherwise formed, a large number of electrically conducting portions 16 that may be in square (as in the drawing), circular or any other suitable shape. These conducting portions 16 are interconnected in a plurality of groups (12 groups in this particular embodiment) by means of printed wiring 18, and each group is connected to each of the aforesaid terminals 17 similarly printed in parallel arrangement on the portion 13 of the base 12. Hence every one of the conducting portions 16 is connected to either one of the terminals 17.

While no specific limitations are imposed upon the manner of interconnecting the conducting portions 16, it is essential or at least desirable that those belonging to one and the same group be distributed as widely as possible on the base 12. One, 19, of the two remaining terminals shown in FIG. 7 is for connection with the electrically conducting sheet 22 hereinafter to be described, while the other remaining terminal is kept in reserve.

As illustrated most clearly in FIGS. 1 and 5, the above described base 12 is overlaid with the electrically insulating sheet 20 which may be thicker than the other sheets and made of sponge, rubber, plastics or the like. The insulating sheet 20 is formed rectangularly, with a size sufficient to cover all but the portions 13 and 15 of the base 12. Perforations 21 are punched or otherwise formed through the insulating sheet 20 at positions corresponding to the locations of the conducting portions 16 of the base 12. Properly laid over and bonded with the base 12, this insulating sheet 20 covers its printed wiring 18 while keeping the conducting portions 16 exposed through the perforations 21.

Also as in FIGS. 1 and 5 the perforated insulating sheet 20 is further overlaid with the electrically conducting sheet 22 of substantially the same size therewith. This conducting sheet 22 may be made entirely of metal or like conducting materials. Alternatively, it may be in the form of a sheet of plastics or other nonconducting materials with a substantially integral layer of conducting material on its surface facing the insulating sheet 20. In either case it is imperative that the conducting sheet 22 be formed sturdily enough, sufficiently deflecting when pressed with the pointed end of the mentioned rod-shaped implement and immediately recovering its initial shape upon release of the pressure. This conducting sheet 22 is electrically connected with the terminal 19 printed on the base 12 together with the other terminals 17 and so forth as precedingly mentioned.

The foregoing base 12, electrically insulating sheet 20 and conducting sheet 22 are altogether enveloped in the covering 11 of plastics or the like. The desired properties of this covering 11 include electrical insulation, strength (so as to withstand the repetitive applications of pressure), flexibility and well finished appearance.

A section of the sensing device 10 constructed substantially as hereinbefore described is illustrated in FIG. 6. As may be clear from this drawing, the perforations 21 of the insulating sheet 20 are located exactly above the conducting portions 16 of the base 12 and are covered with the overlying conducting sheet 22 to define closed spaces 23. Upon depression of the covering 11 and hence the conducting sheet 22 in an area in alignment with one of the perforations 21 by means of the non-conducting rod shaped implement 32, the conducting sheet 22 accomplishes electric contact with the corresponding conducting portion 16 thereby closing the circuit which includes the conducting sheet 22 and one of the aforesaid groups to which that particular conducting portion 16 belongs. No electric contact is made when the pressure of the non-conducting implement 32 is applied at other than the perforations 21. It will accordingly be seen that the thickness of the insulating sheet 20 has to be determined adequately in consideration of the resiliency of its material, so that the conducting sheet 22 may be normally kept sufficiently spaced from the conducting portions 16 and moved into electric contact therewith only upon application of pressure. A smooth, pleasant sensation will be experienced by the user pressing the rod shaped implement 32 if the insulating sheet 20 is made of sponge, rubber or similarly elastic material.

Figure 2:
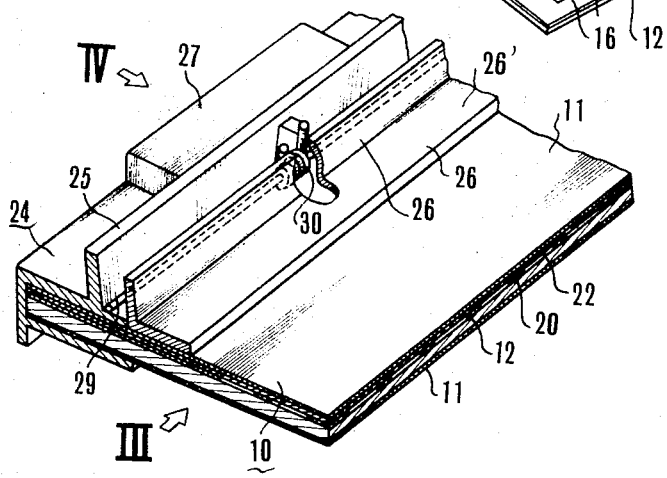
FIG. 2 is an enlarged fragmentary detail perspective view of an explanatory nature showing a top portion of the sensing device of FIG. 1.

As illustrated in FIGS. 1 through 3, a clamp 24 is provided at the upper edge of the sensing device 10 in order to retain each work sheet in position. The clamp 24 includes a portion 25 substantially immovably fixed to the edge of the sensing device, and a movable, pressing portion 26 related therewith in a manner still to be described. The fixed portion 25, which preferably is made of plastics, is substantially U-shaped in cross section so as to snugly receive the mentioned edge of the sensing device 10. The portion 25 thus attached to the sensing device may be secured in place by means of screws (not shown) passing through the aforementioned portions 15 of the insulating base 12.

As best shown in FIG. 4, a boss 27 with a rectangular opening 28 is formed centrally on the fixed portion 25 of the clamp 24. The boss 27 houses the portion 13 of the base 12 as seen through the opening 28 in the drawing, the portion 13 carrying the terminals 17, 19 and so forth as already mentioned.

Referring back to FIGS. 2 and 3, the pressing portion 26 of the clamp 24, which has a substantially L-shaped cross section, is installed so as to be swingable on a pin 29 relative to the fixed portion 25. Pressed by a spring member 30 wound on the pin 29, the pressing portion 26 has its horizontal part 26' resiliently urged against the top surface of the sensing device 10. A pair of spaced apart marks 31 (such as the dots given in FIG. 1) are formed at specified positions on the horizontal part 26' of the pressing portion 26 for correctly positioning each work sheet on the sensing device 10. It is accordingly necessary that the pressing portion 26 be transparent for adjusting its marks 31 with corresponding marks (still to be described) on each work sheet.

The implement 32, which is employed for the user to work on the sensing device 10 in a manner hereinafter to be described in detail, may be in the form of, say, a pencil consisting of a shank 33 and a tip 34, as illustrated by way of example in FIGS. 1 and 6. The tip 34 should not be so sharp ended as to pierce through the sensing device 12 when pressed thereto in use.

As shown in FIG. 1, the displaying device generally designated by the reference numeral 35 has a casing 36 of suitable shape which also may be made of plastics or other lightweight material. The casing 36 has a screen 37, on which various symbols to be described later will be exhibited, and, if desired, a depression 39 on a front panel 38 in which the rod shaped implement 32 is to be placed while not in use. For replacement of a power source such as a battery or cells housed in the casing 36, an openable lid 40 is provided thereon. A depression 40' may be formed on this cover 40 for the sake of convenience in its removal.

Conductor 42 extending out of the displaying device 35 is provided with a connector 43 at its leading end. The connector 43 contains a plurality of terminals 44 that are provided correspondingly to the aforesaid terminals 17 and 19 on the portion 13 of the base 12. Shaped in accordance with the opening 28 (refer to FIG. 4) of the fixed portion 25 of the clamp 24, the connector 43 is detachably inserted thereinto to complete electric contact between the respective terminals 44 and terminals 17 and 19.

FIG. 8 is a circuit diagram of an explanatory nature showing the circuits incorporated in the interconnected sensing device 10 and displaying device 35. Twelve lamps 47, corresponding to the aforesaid 12 groups of the conducting portions 16 of the sensing device 10, are arranged in side by side relationship along the back of a plate member 46 through which are formed a plurality of symbols which may include numerals, letters, characters and the like. This plate member 46 is concealed from view behind the screen 37, which may be dark in color, of the casing 36. In this particular embodiment of the invention the plate member 46 is marked with numerals 1 through 10 and, on both sides of the numerals, the word GOOD together with an arrow mark and the words TRY NEXT SHEET together with an arrow mark. A total of 12 symbols are thus formed adjacent the respective lamps 47.

Each of the lamps 47 is connected on one hand to a common wire 45 which is itself connected with the power source 41 and which also is connected to the conducting sheet 22 of the sensing device 10 as indicated by lines 50 in order to facilitate the illustration. On the other hand the lamps 47 are respectively connected by wires 48 to the precedingly mentioned 12 groups of the conducting portions 16 as indicated within dotted areas 49.

Upon depression of a selected one of the areas 49 by means of the rod shaped implement 32, electric contact is accomplished between the conducting sheet 22 and the particular conducting portion 16 in that selected area. This closes the circuit to the corresponding one of the lamps 47 thereby causing the same to be lighted and hence causing the adjacent symbol on the plate member 46 to be displayed on the screen 37.

Although the displaying device 35 in this particular embodiment of the invention has its own power supply installed therein, it is, of course, possible to utilize commercial current by providing a connector to a household receptacle. After use, the sensing device 10 and the displaying device 35 may be separately kept in storage by disconnecting the connector 43 from the sensing device 10.

Shown purely by way of illustration in FIG. 9 is an associated pair of work sheets 51 and 52 for use with the precedingly described self-teaching system of the present invention. Desirably, the work sheets are provided in not too tightly bounded book format, in which matters to be self-taught or learned by the user are arranged from the first page to the last in accordance with a carefully prepared program. In the particular work sheets of FIG. 9, some illustrated questions and selectable answers are printed or otherwise recorded to give some elementary knowledge of electricity to school age children.

The work sheet 51 contains a series of questions together with some likely answers 54 including the correct one, whereas the work sheet 52 contains only the correct answers to be learned by the user in event he has failed to choose the correct answers for the questions of the work sheet 51. A mark such as a dot 55, to be pressed by the implement 32, accompanies each of the answers 54 in the work sheet 51. Also in the other work sheet 52, marks such as dots 55' are provided below the pictures. Further therebelow the correct answers 54' indicating the illustrated articles are given at random together with the accompanying numerals.

Each work sheet may be designated by an "address" in accordance with the predetermined program of the complete workbook, like those indicated by the reference numerals 57 and 57' at the upper outer corners of the particular work sheets 51 and 52. Further, at the bottom margins of the respective work sheets, marks such as dots 56 and 56' are provided which are to be pressed by the user after working through all the questions in each sheet in order to know the address or page of the sheet to which he should then proceed. Marks 58 are given at the top margin of each work sheet for adjustment with the aforesaid marks 31 formed in the transparent pressing portion 26 of the clamp 24.

Proceeding now to the description of how to use such work sheets with the precedingly described self-teaching system of this invention, let it first be assumed that the work sheet 51 is placed upon the sensing device 10 of FIG. 1. By manually raising the pressing portion 26 of the clamp 24, the top edge of the work sheet 51 is inserted therebelow. The pressing portion 26 should be released only after properly adjusting the marks 58 of the work sheet 51 with the corresponding marks 31 thereof and hence correctly positioning the sheet on the sensing device 10.

The user is required to press with the implement 32 one of the marks 55 accompanying what he thinks is the correct answer. The resultantly established contact between the depressed area of the conducting sheet 22 and one of the conducting portions 16 closes the circuit to the corresponding one of the lamps 47 and hence causes the same to be lighted (refer to the circuit diagram of FIG. 8). The symbol positioned adjacent the lighted lamp is now exhibited on the screen 37 of the displaying device 35.

If the answer selected by the user is correct, the word GOOD together with the arrow mark will be displayed on the screen 37. Should he choose a wrong answer, the screen will show the words TRY NEXT SHEET together with the arrow mark.

The user who has selected the correct answers for all the questions in the work sheet 51 is suggested to press the mark 56 at the bottom margin of the sheet, whereupon the next work sheet to which he should proceed will be numerically exhibited on the screen 37 either by its address or page as precedingly mentioned. In case the user has failed to give the correct answers he should go on to the next work sheet 52 as indicated by the words previously exhibited on the screen 37. This work sheet 52 also is retained in position on the sensing device 10 by means of the clamp 24. By pressing the marks 55' below the respective pictures in this sheet with the implement 32, there will be displayed on the screen 37 the numerals accompanying the correct answers given at random below the pictures. The user is thus enabled to know the correct answers for the questions of the preceding sheet 51.

While the invention herein disclosed is designed primarily for instructional purposes, it will be readily understood that it is equally employable for other purposes such as, for example, amusement, this by providing specially devised games on the sheets to be placed upon the sensing device and by correspondingly modifying the symbols to be displayed on the screen. This and other modifications within the skill of those in the art are contemplated as being within the scope of the invention as defined by the appended claims.

What is claimed is:

1. An electric self-teaching system comprising, in combination:

a sensing device comprising a rectangular base of electrically insulating material having a number of electrically conducting portions printed thereupon which are electrically interconnected into a plurality of groups in a prescribed manner, an electrically insulating sheet overlying said insulating base and having a number of perforations therethrough in alignment with said printed conducting portions, an electrically conducting flexible sheet overlying said insulating sheet while being normally spaced apart from said printed conducting portions by said perforated insulating sheet, and a flexible covering of electrically insulating material in which said base and said perforated insulating sheet and said conducting sheet are substantially completely enclosed, said conducting sheet being depressible together with said covering by applied pressure into electric contact with one of said printed conducting portions to close the circuit including the group to which said one printed conducting portion belongs;

a reusable work sheet overlying the sensing device, the work sheet containing questions and selectable answers together with accompanying marks arranged according to a predetermined program so as to be in alignment with the perforations of said insulating sheet;

a non-conducting rod shaped implement for pressing on said work sheet at any of said accompanying marks and to thereby apply pressure on said depressible conducting sheet;

clamp means for retaining the work sheet in position upon the sensing device, the clamp means including a first portion fixed at the upper edge of the sensing device, and a second portion related with said first portion so as to be resiliently pressed against the top surface of the sensing device, said second portion carrying marks for adjustment with corresponding marks provided on the work sheet whereby the work sheet is held in position upon the sensing device;

a plurality of terminals respectively connected to said groups of conducting portions printed upon said insulating base and another terminal connected to said conducting flexible sheet, all of the terminals being arranged in side-by-side relationship adjacent one edge of said insulating base;

a visual displaying device electrically associated with the sensing device, said displaying device comprising a casing having a screen, a plate member disposed behind said screen, said plate member being provided with a plurality of normally concealed symbols, and a plurality of lamps respectively disposed adjacent to said symbols, said lamps being respectively connected to the circuits incorporated in the sensing device whereby, upon closure of one of said circuits, the corresponding one of said lamps is lighted thereby causing the adjacent symbol to be exhibited on said screen;

said displaying device visually exhibiting said symbols in the form of answers and instructions in response to which of said marks accompanying said questions and selectable answers has been pressed;

a detachable connector connectible to the sensing device containing terminals leading from said respective lamps for junction with the respective circuit of the sensing device; and said rectangular base of electrically insulating material having said electrically conducting portions arranged on the top surface thereof so as to leave at least an upper margin, the electrically insulating sheet overlying all but the upper margin of said insulating base, the electrically conducting flexible sheet overlying the top surface of said insulating sheet being normally spaced apart from said conducting portions by said insulating sheet, and the clamp means enclosing said terminals on the upper margin of said insulating base.

* * * * *